INVENTORS
JOHN W. MARTINDALE
ARMANDO CARDENAS
BY Joseph Januszkiewicz
ATTY.

United States Patent Office 3,506,748
Patented Apr. 14, 1970

3,506,748
TIRE CURING APPARATUS AND METHOD
Armando Cardenas, Cuyahoga Falls, and John W. Martindale, Medina, Ohio, assignors to The B. F. Goodrich Company, New York, N.Y., a corporation of New York
Filed Jan. 18, 1966, Ser. No. 521,373
Int. Cl. B29h 5/02, 5/18
U.S. Cl. 264—94
4 Claims

ABSTRACT OF THE DISCLOSURE

A method and apparatus for making a tire with sidewalls having axially folded portions therein. The apparatus contains three pieces including upper and lower mold parts and an intermediate mold part. The upper and lower mold parts have annular projection means extending axially toward each other, the outer end portions thereof being closely adjacent to each other when the mold is in a closed position. Means for clamping tire beads are also provided on the upper and lower mold parts. A means is provided for aligning the intermediate mold part with the center line of a tire carcass and these means allow for unrestricted axial movement of the intermediate mold part between the upper and lower mold parts. In the method, an uncured cylindrical tire is located in the mold and beads in the tire are clamped by the upper and lower mold sections to form a chamber. The chamber is inflated to move the tread portion of the tire radially outward into engagement with the intermediate part of the mold. One end part and the intermediate part of the mold are moved toward the other and mold part to close the mold and shape the side walls of the mold into reentrant folds. The tire is then cured with the folds therein.

---

Figure 1:
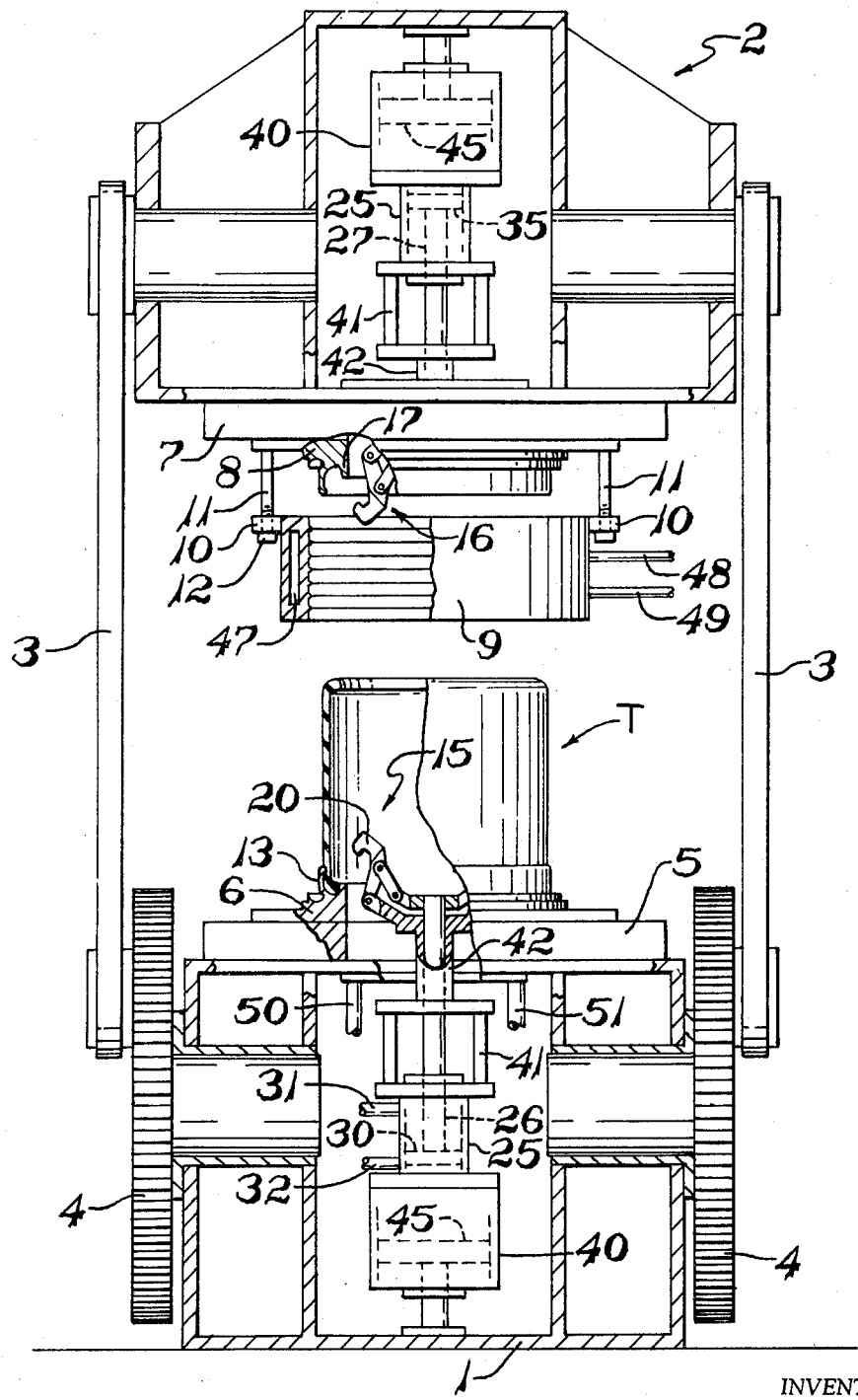

The present invention relates to a method and apparatus for curing tires and more particularly to a novel method and apparatus which cures tires including a collapsible tire with axial circumferentially extending folds in the sidewalls thereof.

The present practice is to build tires on a generally cylindrical drum by wrapping the successive layers of rubberized fabric or ply stock around the drum; turning down the plies at the end shoulders of the drum, applying bead rings on the shoulders of the drum; turning up the plies around the bead rings; and applying the sidewalls and tread to the tire carcass being built. The formed tire carcass which is in the shape of a pulley band is inserted into a curing press for shaping and curing into a permanently shaped toroidal form.

Those concerned with the development of passenger tires have long recongized the bulky nature of such tires as spare tires in the trunk of cars; however, nothing has been done to merit the replacement of such tires nor substitution for their spare.

The present invention provides a method and apparatus which produces an expansible tire which in its uninflated condition is compact and takes up relatively small amount of storage space in comparison to the conventional tire, yet has comparable load carrying capacity to assure proper performance. As an example of the tire's compactness, it is possible to manufacture a passenger car tire whose outside diameter is up to 40% smaller when the tire is uninflated than when it is inflated. In addition, the lateral width of the tire may be 10% smaller when uninflated than inflated. Such tires have even greater compactness when considering their use for aircrafts since there may be greater differences in the size and overall volume between the uninflated and inflated condition of a typical tire and wheel assembly. Even in the uninflated condition the tire has sufficient load-carrying capacity to assure safe performance to permit the operator to travel to a repair shop or station.

The invention provides a novel method which cures a tire by initially inflating the tire carcass with the intermediate portion confined within limits against a free floating ring and thereafter shaping the respective sidewall portions into axial folds to permanently set the shape of such finished product into a compact unit. The apparatus utilizes a three piece sectional mold with a central floating section which cooperates with the upper and lower sections to provide a vulcanized axially folded tire.

An object of the present invention is to provide a novel method for manufacturing a pneumatic tire.

A further object of this invention is to provide a novel method for manufacturing compact expansible tires with axially folded sidewalls.

Another object of this invention is to provide a novel means for manufacturing a tire which upon deflation is compact and of a size substantially smaller than it assumes in the running condition.

An object of this invention is to provide at least a novel three-piece sectional mold with cooperative parts which assures uniformity in tire curing.

Another object of this invention is to provide a new and improved apparatus for molding expansible tires having permanently cured axially folded sidewalls.

A further object of this invention is to provide an improved apparatus which cures axially folded sidewalls into a tire carcass.

These and other objects and advantages will be more readily appreciated as the same becomes better understood by reference to the following detailed description in connection with the accompanying drawings.

FIG. 1 is a front elevational view, partly in cross section, of a tire curing press constructed in accordance with the present invention.

Figure 2:
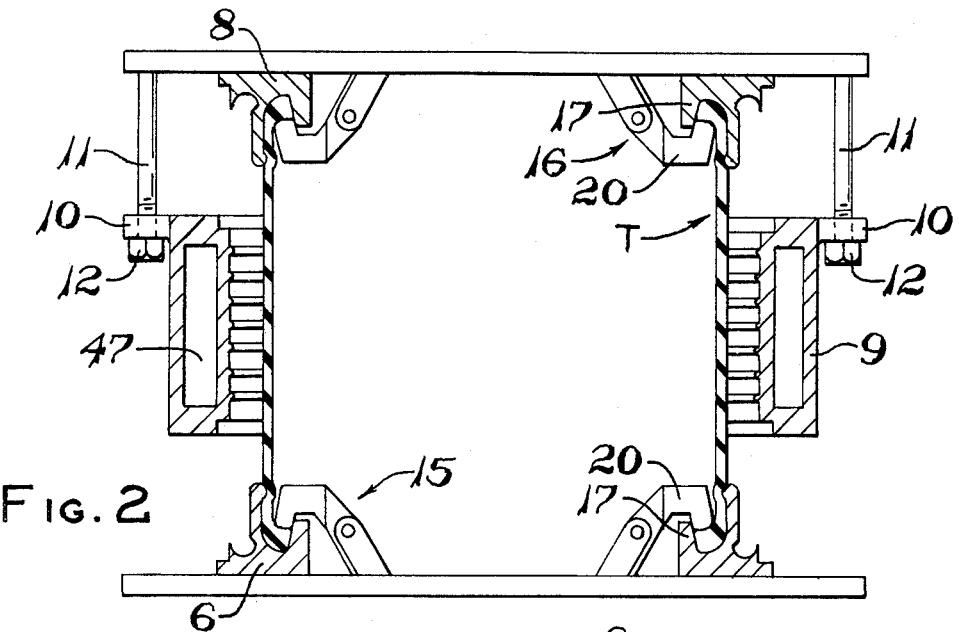
Figure 3:
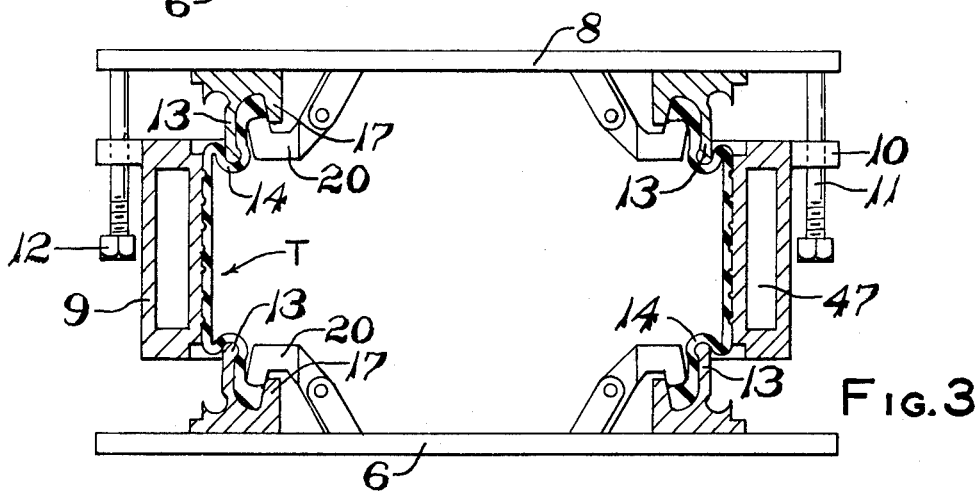
Figure 4:
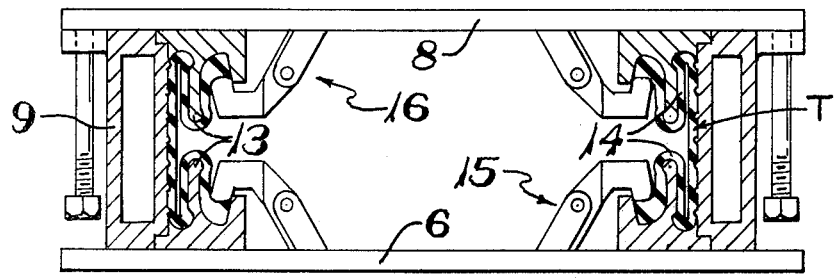

FIGS. 2 to 4, inclusive, are a series of schematic diagrams showing a preferred sequence of steps in the forming of a tire in a bagless tire curing press of the type constituting the present invention.

Referring now to the drawings, there is shown in FIG. 1 a tire curing press comprising a base 1 and an upper vertically reciprocal press head 2 which is vertically guided on suitable guide rods not shown. The press head 2 is vertically reciprocated as by links 3,3 pivotally secured thereto and to bull gears 4,4 that are rotatably secured on sides 1. In general, the press head generally resembles that described in U.S. Patent 2,959,815 and U.S. Patent 3,153,263.

The base has mounted thereon a heating platen 5 which is jacketed for circulation of curing medium such as steam or hot water therethrough, and mounted on such platen 5 is a lower mold section 6. The press head 2 has mounted thereon a heating platen 7 which carries the upper mold section 8. Located between the upper and lower mold sections 8 and 6 is an intermediate tread mold section 9 which has a plurality of laterally extending lugs 10 with bores extending vertically therethrough. The intermediate mold section 9 rests on the lower end portion of a plurality of vertically depending threaded guide rods 11 which have nuts 12 secured thereto to maintain a fixed relationship between the intermediate mold section and the upper mold section 8 for a purpose to be described. Guide rods 11 are adjustably mounted on the upper mold section to accommodate different size intermediate mold sections. The intermediate section 9 has a circumferential pattern which is a negative impression for molding a tread pattern on the tire. The lower and upper mold section in cooperation with the intermediate section 9 when brought together in mating engagement defines therebetween a cavity of a tire shaped with the lower and upper mold section having annular projections 13 extending axially along the sidewall portions of the mold to provide axially folded sidewall portions 14 on the molded tire as shown in FIG. 4.

The lower and upper mold sections 6 and 8 have associated therewith bead shaping and pressing assemblies 15 and 16 which are adapted to clamp, shape and compress the respective beads of the pulley band tire carcass T that is adapted to be positioned in an upright position on the toe ring 17 of the lower mold section 6 when the press is opened, that is, with the upper press head 2 moved in the extreme uppermost position as shown in FIG. 1. The pressing assemblies 15 and 16 are identical, each comprising a collapsible ring made up of alternate short and long segments 20 having beveled ends. A detailed description of the operation of the bead shaping and pressing assembly is fully described in U.S. Patent 3,153,263. However, for purposes of the present discussion, it is sufficient to note that hydraulic cylinders 25 connected to base 1 and press head 2 contain piston rods 26 and 27 which upon extension operate to selectively clamp the arcuate segments 20 into cooperative engagement with the bead portion of a tire carcass T located within the mold into abutting engagement with the upper and lower toe rings 17. When the bead shaping and pressing assembly 15 is in the collapsed position, its circumferential peripheral dimension is reduced thereby facilitating the placement of the green tire carcass T onto the lower mold part without interference.

In the bead shaping and pressing assembly (FIG. 1), the bead shaping and pressing assembly 15 is shown in a collapsed condition to which condition it has been actuated by downward movement of the piston rod 26 and piston 30 of hydraulic cylinder 25 to the bottom position in the cylinder 25 by admission of pressurized fluid through a conduit 31 in the uppermost end portion of cylinder 25. To form a continuous bead-shaping and pressing ring, fluid under pressure is admitted through a conduit 32 in the bottom portion of cylinder 25 whereby the piston 30 and piston rod 20 are moved to the upper limit of its stroke thereby pivoting the respective segments 20 outwardly into engagement with the bead of a tire positioned on the toe 17. Such condition of the bead shaping and pressing assembly 15 is referred to as the uncollapsed condition.

The bead shaping and pressing assembly 16 associated with the upper mold section 8 is of the same construction as assembly 15 associated with the bottom mold section 6 except inverted. Thus, assembly 16 includes the cylinder 25 having a piston 35 reciprocable therein and the piston rod 27 carrying the respective links for pivoting the segments 20 associated therewith into clamping engagement with the bead portion of the tire carcass T.

After the bead shaping and pressing assembly is positioned on the rim of the tire T, means are provided for axially moving the collapsed bead assemblies 15 and 16 toward the respective mold sections 6 and 8 as by upper and lower cylinders 25 and 26 which through the above-mentioned cylinders 25 and 26 and through tie rods 41 and tubular shafts 42, secured to the bead shaping and pressing assemblies 15 and 16 provide a pressing and shaping action as more fully described in U.S. Patent 3,153,263. Such cylinders 40 move vertically upwardly with respect to the piston 45 contained therein when fluid under pressure is admitted to the space above piston 45 of piston 40 as in the case of the lower assembly 15 and downwardly in the case of the upper assembly 16. When fluid under pressure is admitted in the lower cylinder 40 beneath the piston 45, the cylinder 40 together with its attached parts is moved downwardly in the case of the lower assembly 15 and upwardly in the case of upper assembly 16. Thus, the uncollapsed assemblies 15 and 16 may be axially moved toward the respective mold sections 6 and 8 to exert predetermined pressing and shaping pressure on the respective tire beads in accordance with the magnitude of the fluid under pressure in the cylinders 40. The intermediate mold 9 has an annular chamber 47 (FIG. 3) which provides means by which steam or other vulcanizing fluid can be circulated through such mold section to vulcanize the tread portion which is in engagement therewith as via conduits 48 and 49 connected thereto as shown in FIG. 1. Vulcanizing fluid or pressurized fluid may also be introduced and withdrawn into the chamber formed by the tire carcass T and the respective mold sections 6 and 8 via conduits 50 and 51 (FIG. 1).

Referring now to FIGS. 2, 3 and 4, the following is a procedure in the operation of the present tire curing apparatus. The press is fully opened and the press assemblies 15 and 16 are in collapsed condition as shown in FIG. 1. The pulley band carcass T is then inserted between the intermediate mold section 9 and the lower mold section 6 and then slipped over the collapsed lower assembly 16 so that the bottom bead rests on the toe ring 17 of the bottom mold section 6. The head end of lower hydraulic cylinder 25 is pressurized as via conduit 32 to move piston rod 26 upwardly to uncollapse the bead shaping and pressing assembly 15 which cooperates with the lower toe ring 17 to secure the lower bead ring of the green tire carcass T therebetween. Such action centers the tire carcass T in the mold.

The top mold section 8 is then moved downwardly until the bead portion of pulley band carcass T abuttingly engages the upper toe ring 17. At this position, the center line of intermediate mold section 9 is located midway between the respective end portions of the tire carcass T. The head end of upper hydraulic cylinder 25 is pressurized to move piston rod 27 downwardly to uncollapse the bead shaping and pressing assembly 16 which cooperates with the upper toe ring 17 to secure the upper bead ring of the green tire carcass T therebetween. As pressurized air is introduced into the chamber formed by the tire carcass T and the respective end sections 6 and 8, the head end of cylinders 25 are also pressurized to selectively clamp the bead portion of a tire carcass T between the arcuate segments 20 and the respective toe rings 17. Such pressurization of the chamber causes a swelling out of the central portion of the tire carcass T such that the tread portion of the carcass T abuttingly engages the intermediate mold section 9. The head end of cylinders 40 are then pressurized to axially move the uncollapsed assemblies 15 and 16 towards the respective mold sections 6 and 8 to exert predetermined pressing and shaping pressure on the respective tire beads as explained above. The upper mold section 8 along with press head 2 is moved downwardly toward the lower mold section 6. Since the intermediate section 9 is in abutting engagement with the tread of the tire carcass such section 9 is free to float to maintain alignment of the central portion of the tire carcass. As the upper mold section 8 continues its descent, the sidewall portions of the tire carcass begin to overlap the annular projections 13 with the intermediate section 9 moving downward progressively as shown in FIG. 3. Continued movement of upper mold section 8 and intermediate section 9 fold the sidewalls axially over the respective annular projections 13 until the respective sections 6, 8 and 9 are in complemental engagement as shown in FIG. 4. With the mold sections 6 and 8 in mating engagement, curing medium under pressure is circulated through the chamber defined by the tire carcass T and the upper and lower mold sections 8 and 6 as well as to the clearance space provided by the clearance space between the axial folded sidewall portions 14 to effect curing to the final shape. The curing medium and condensate are then removed prior to the separation of the mold sections 6 and 8, and the respective bead shaping and pressing assemblies 15 and 16 are moved into collapsed condition releasing the beads of the cured tire after which the cured tire is removed from the mold. The molding apparatus is then prepared for another molding operation.

We claim:

1. The method of manufacturing a tire comprising the steps of locating an uncured cylindrical tire having end bead portions, an intermediate annular tread portion and spaced sidewall portions in a mold having spaced bead seats and an intermediate tread ring section; clamping the respective end bead portions of the tire on the respective bead seats of the mold and cooperative therewith to form a chamber; inflating said chamber to move the intermediate tread portion of the tire radially outwardly into abutting engagement with said tread ring section to align the circumferential center line of the tire with the circumferential center line of the tread ring section and thereby limit circumferential expansion of the tread; moving one end portion and the intermediate tread portion of said uncured tire relatively toward the other end portion of the uncured tire to shape the sidewall portions of the tire into reentrant folds; and curing such tire with said reentrant folds therein; said moving of said intermediate tread portion of said uncured tire being unrestricted in an axial movement between said end bead seats after engagement of said intermediate tread portion with said tread ring section as said ring section moves.

2. The method of manufacturing a tire from an uncured tire of cylindrical configuration having end bead portions, an intermediate annular tread portion and a pair of spaced sidewall portions which sidewalls are located between the bead portions and the tread portion, comprising the steps of locating and clamping the respective bead portions of the uncured tire in a molding apparatus which uncured tire cooperates with said mold to define a closed chamber, inflating said chamber to move the tread portion of the uncured tire into abutting engagement with an annular center ring mold section to align the circumferential center line of the tire with the circumferential center line of the annular center ring mold section, restricting the radial movement of said tread portion of said tire, moving said tread portion of said tire and one of said bead portions relatively toward the other of said bead portions to shape the respective sidewalls of the tire into axial folds, said moving of said tread portion of said mold after contact by said green uncured tire being unrestricted in an axial direction between the spaced seated bead portions of the tire, and curing such shaped tire.

3. An apparatus for vulcanizing a rubber tire having a lower mold section and an upper mold section, an intermediate annular mold section located between said lower and upper mold sections having a tread design on its inner circumferentially extending section for impressing a tread groove pattern on the tire; annular projection means on said upper and lower mold section extending axially toward each other and having outer end portions closely adjacent to each other for molding axial folds on the sidewalls into a tire when said mold sections are in abutting engagement to form a closed mold; means on said upper and lower mold sections for clamping the tire beads to said respective mold sections; means connected to said lower mold section for introducing pressurized fluid into a green tire held by said lower and upper mold sections to expand the green tire and move the tread portion of the green tire into abutting engagement with said intermediate annular mold section; means locating said intermediate mold section to align the circumferential center line of said intermediate mold section with the center line of the green tire and provide unrestricted axial movement thereto between the upper and lower mold sections; means coordinating the movement of said upper and intermediate mold sections into interfitting relationship relative to said lower mold sections to mold a tire having its sidewalls extending axially under the tread, and means for introducing vulcanizing medium into said mold to cure said tire.

4. An apparatus as set forth in claim 3, wherein said means locating said intermediate mold section to align the circumferential center line of said intermediate section with the center line of the green tire includes means interconnecting said upper and intermediate mold sections to provide movement to said upper and intermediate mold sections toward and away from said lower mold section, and said interconnecting means having vertically extending tie rods interconnecting said upper and intermediate sections permitting relative vertical movement between said upper and intermediate mold sections.

References Cited

UNITED STATES PATENTS

| RE 15,518 | 1/1923 | Schwartz | 264—326 |
|---|---|---|---|
| 1,101,732 | 6/1914 | Doughty. | |
| 1,417,180 | 5/1922 | Kline | 264—326 X |
| 2,802,239 | 8/1957 | Bosomworth et al. | 264—326 X |
| 2,978,749 | 4/1961 | Del Mar. | |
| 3,276,930 | 10/1966 | Keefe | 264—326 X |
| 2,959,817 | 11/1960 | Bank. | |
| 3,347,964 | 10/1967 | Sidles | 264—94 |

ROBERT F. WHITE, Primary Examiner

J. H. SILBAUGH, Assistant Examiner

U.S. Cl. X.R.

18—2, 17; 264—315, 326